United States Patent
Byker et al.

(10) Patent No.: US 6,594,065 B2
(45) Date of Patent: *Jul. 15, 2003

(54) ELECTROCHROMIC STRUCTURES

(75) Inventors: Harlan J. Byker, Holland, MI (US); David J. Cammenga, Zeeland, MI (US); John K. Roberts, East Grand Rapids, MI (US)

(73) Assignee: Gentex Corporation, Zeeland, MI (US)

( * ) Notice: Subject to any disclaimer, the term of this patent is extended or adjusted under 35 U.S.C. 154(b) by 56 days.

This patent is subject to a terminal disclaimer.

(21) Appl. No.: 09/866,930

(22) Filed: May 29, 2001

(65) Prior Publication Data

US 2001/0030793 A1 Oct. 18, 2001

Related U.S. Application Data

(63) Continuation of application No. 09/200,625, filed on Nov. 30, 1998, now Pat. No. 6,239,898.

(51) Int. Cl.⁷ .................................................. G02F 1/15
(52) U.S. Cl. ...................... 359/265; 359/268; 359/272; 359/275
(58) Field of Search ................................ 359/265, 275

(56) References Cited

U.S. PATENT DOCUMENTS

| | | | |
|---|---|---|---|
| 3,280,701 A | 10/1966 | Donnelly et al. | 359/267 |
| 4,902,108 A | 2/1990 | Byker | 359/265 |
| 5,066,112 A | 11/1991 | Lynam et al. | 359/267 |
| 5,069,535 A | 12/1991 | Baucke et al. | 359/273 |
| 5,076,673 A | 12/1991 | Lynam et al. | 359/271 |
| 5,115,346 A | 5/1992 | Lynam | 359/604 |
| 5,239,406 A | 8/1993 | Lynam | 359/275 |
| 5,253,109 A | 10/1993 | O'Farrell et al. | 359/604 |
| 5,724,187 A | 3/1998 | Varaprasad et al. | 359/608 |
| 5,805,330 A | 9/1998 | Byker et al. | 359/265 |
| 5,818,625 A | 10/1998 | Forgette et al. | 359/267 |
| 6,239,898 B1 * | 5/2001 | Byker et al. | 359/265 |

FOREIGN PATENT DOCUMENTS

| | | |
|---|---|---|
| EP | 0728618 | 8/1996 |
| WO | 9530495 | 11/1995 |

* cited by examiner

*Primary Examiner*—Evelyn Lester
(74) *Attorney, Agent, or Firm*—Price, Heneveld, Cooper, DeWitt & Litton; Brian J. Rees

(57) ABSTRACT

Electrochromic structures, such as windows and panels, are provided wherein privacy and changes in the color of an electrochromic medium incorporated in the structures may be either enhanced or hidden when viewed from a predetermined direction, as for example, when viewed from the outside of a building or when viewed from one side of a transparent interior panel in a building.

24 Claims, 1 Drawing Sheet

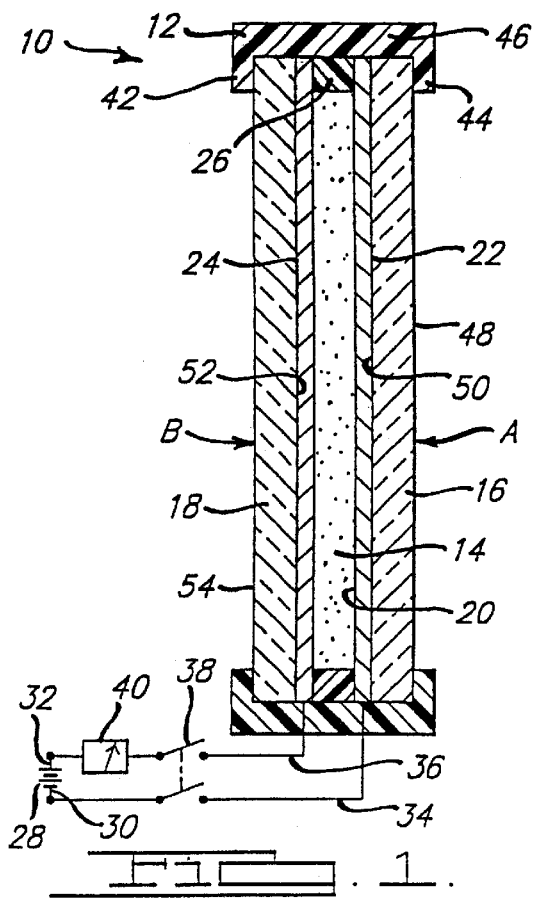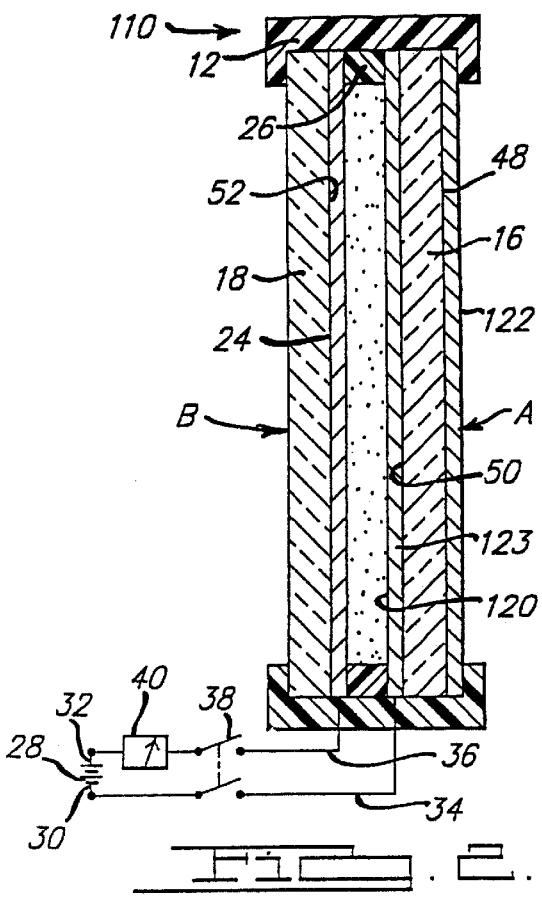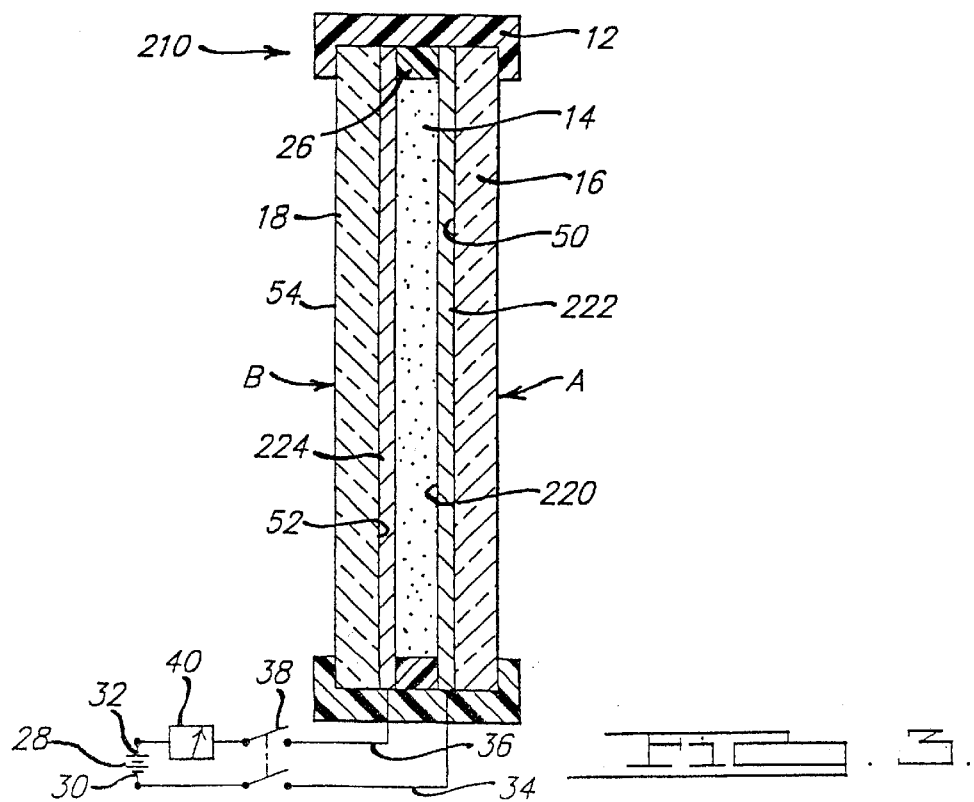

ELECTROCHROMIC STRUCTURES

CROSS REFERENCE TO RELATED APPLICATIONS

This application is a continuation of U.S. patent application Ser. No. 09/200,625, filed on Nov. 30, 1998 entitled "ELECTROCHROMIC STRUCTURES," now U.S. Pat. No. 6,239,898, the entire disclosure of which is incorporated herein by reference.

BRIEF SUMMARY OF THE INVENTION

This invention relates to electrochromic structures, such as the exterior windows of a building, and panels, such as interior partitions in a building. The present invention is also applicable to other uses, as for example, to windows and/or panels in automotive vehicles as well as various other structures and/or devices employing windows and/or panels. More particularly, the present invention relates to electrochromic structures such as windows and panels wherein changes in the color of an electrochromic medium incorporated therein may be either enhanced or hidden when viewed from a predetermined direction, and wherein changes in the light transmission of an electrochromic medium incorporated therein may provide for differential privacy when viewed from similarly well lit opposing sides of the electrochromic structure.

Heretofore, partially light transmitting mirrors, sometimes referred to as one-way mirrors, have been devised wherein privacy may be obtained by employing differential light levels on opposing sides of a partially light transmitting reflectively coated window. Another prior technology used for privacy purposes is a polymer dispersed liquid crystal window which scatters light so as to provide for privacy. With still other prior technologies, variable transmittance electro-optic windows were devised which reduced the visibility through a window by lowering the transmission of light through an electro-optic medium, the level of privacy, herein defined as the ratio of reflectance to transmittance, being approximately equal when viewing from either side of the window in equal lighting situations. A low transmission, less than or equal to 5%, is required to obtain reasonable levels of privacy with this type of electro-optic device for lighting levels common to most buildings. Typically it is more expensive and more difficult to produce an electro-optic device with lower light transmission in the darkened state. Also, it is sometimes desirable to have a higher level of privacy from one side of an electro-optic window than from the other side thereof. This can not be achieved with prior variable transmittance electro-optic devices.

Heretofore, various electrochromic devices have also been proposed wherein the transmission of light therethrough or reflected thereby varies as a function of changes in light absorption of an electrochromic medium incorporated therein, the light absorption of the electrochromic medium, in turn, varying in response to the application of electrical potential to the electrochromic medium. Thus, devices of reversibly variable transmittance have been proposed for such applications as light filters, variable reflectance mirrors and display devices. The variable transmittance light filters have included windows and panels wherein the transmittance or reflectance of light is varied by thermochromic, photochromic, or electro-optic means such as liquid crystals, dipolar suspension, electrophoretic and electrochromic means, either solution phase or solid state or hybrid, and wherein the variable transmittance characteristics are present in at least the visible light spectrum, i.e. light wave lengths from about 3,800 angstroms to about 7,600 angstroms. Proposed control systems for variable transmittance windows and panels typically either permit the light transmittance of the windows and panels to be manually controlled through the application of electrical potential to an electro-optic medium to darken the windows and panels or the windows and panels may be automatically darkened through the agency, for example, of photocells or photovoltaic devices or other devices, which function to effect the application of electrical potential to the electro-optic medium. Numerous prior electrochromic devices are identified in U.S. Pat. No. 5,805,330, issued Sep. 8, 1998, and entitled Electro-optic Window Incorporating a Discrete Photovoltaic Device. U.S. Pat. No. 5,805,330 is owned by the assignee of the present invention and U.S. Pat. No. 5,805,330 is hereby incorporated herein in its entirety by reference.

In accordance with the present invention, electrochromic structures, such as windows and panels, are provided wherein differential privacy may be enhanced when viewed from a predetermined direction or wherein changes in the color of an electrochromic medium incorporated therein may be either enhanced or hidden when viewed from a predetermined direction, as for example, when viewed from the outside of a building or when viewed from one side of a transparent interior partition in a building.

The present invention is applicable, for example, to windows on the outside of a building and is also applicable to transparent panels or partitions in the interior of a building, as for example, transparent partitions or panels which define a room and which partitions or panels may be darkened, as desired, for privacy purposes. Thus, in accordance with the present invention, privacy may be enhanced on one side of an electrochromic structure by raising the reflectance on one of the surfaces of the opposing substrate incorporated in the window or panel. In addition, partially light reflective coatings may be incorporated in the windows or panels in a predetermined manner whereby any changes of appearance of a building due to changes in color of the electrochromic medium, when viewed from the outside of a building, may be hidden, or; in the alternative, partially light reflective coatings may be incorporated in the windows or panels in a predetermined manner whereby changes in appearance of a building, due to changes in color of the electrochromic medium, may be enhanced when viewed from outside the building.

Accordingly, an object of the present invention is to provide improved electrochromic structures, such as electrochromic windows and panels, which incorporate improved means for varying the amount of light that is transmitted therethrough and wherein privacy may be enhanced by raising the reflectance characteristics of one substrate relative to another substrate incorporated in the electrochromic structure.

Another object of the present invention is to overcome disadvantages in prior electro-optic structures of the indicated character, and to provide improved electrochromic structures wherein changes in the apparent color thereof may be either enhanced or hidden when viewed from a predetermined direction.

Another object of the present invention is to provide improved electrochromic windows and panels in which the transmittance of light therethrough or the reflectance of light thereby may be manually or automatically controlled to achieve an aesthetically pleasing appearance, or functional, i.e. displaying a pattern or wording on a building's exterior.

Another object of the present invention is to provide improved electrochromic windows and panels incorporating improved means for providing a higher level of privacy, the ratio of light reflectance to light transmittance, than variable transmittance electro-optic windows and panels known in the prior art.

Another object of the present invention is to provide improved electrochromic windows and panels which enable the use of a partially light reflective and a partially light transmissive component as an electrode for the electrochromic medium.

Another object of the present invention is to provide improved electrochromic windows and panels which provide for a different level of privacy when viewing the windows and panels from one direction as compared to another direction.

The above as well as other objects and advantages of the present invention will become apparent from the following description, the appended claims, and the accompanying drawings.

BRIEF DESCRIPTION OF THE DRAWINGS

FIG. 1 is a simplified cross sectional view of one embodiment of the invention;

FIG. 2 is a simplified cross sectional view of another embodiment of the invention; and FIG. 3 is a simplified cross sectional view of still another embodiment of the invention.

DETAILED DESCRIPTION

Referring to the drawings, and more particularly to FIG. 1 thereof, there is schematically illustrated therein an electrochromic structure in the form of a window, generally designated 10, embodying the present invention. It should be understood that the electrochromic structure may be in the form of an outside window on a building or may be in the form of a panel or partition in the interior of a building, and that the present invention is also applicable to other uses such as, for example, to windows and panels in automotive vehicles and various other structures employing windows and/or panels. In general, electrochromic structures, such as windows or panels embodying the present invention, are comprised of a frame 12 which functions to support the other components of the electrochromic structure, and may also be used for electrical bus purposes. Thus, the frame 12 carries glass or plastic transparent substrates and electrochromic media as will be described hereinafter in greater detail. In this embodiment of the invention, the window 10 includes a thin layer 14 of an electrochromic medium disposed between two glass or plastic transparent substrates 16 and 18. When electrical potential is applied to the electrochromic medium 14, the electrochromic medium darkens and begins to absorb light. The higher the voltage, the darker the window becomes. When the electrical voltage is decreased to zero, the window returns to its clear state. The electrochromic components of a window or panel embodying the present invention may, for example, be of the type disclosed in U.S. Pat. No. 4,902,108, issued Feb. 20, 1990, for Single-Compartment, Self-Erasing, Solution-Phase Electrochromic Devices, Solutions For Use Therein, and Uses Thereof, and assigned to the assignee of the present invention. The entire disclosure of U.S. Pat. No. 4,902,108 is hereby incorporated herein by reference. It should also be understood that, if desired, other types of electrochromic materials may be utilized in practicing the present invention. For example, copending U.S. patent application, Ser. No. 08/832,596, filed Apr. 2, 1997, entitled An Improved Electrochromic Medium Capable of Producing a Preselected Color discloses and claims an electrochromic medium, which may be solution-phase, surface-confined, hybrid or electrodeposited that is capable of producing a preselected color. The entire disclosure of copending application Ser. No. 08/832,596 is hereby incorporated herein by reference. If a solution-phase electrochromic medium is used it should preferably incorporate a crosslinked polymer matrix to help alleviate hydrostatic pressure. Copending U.S. patent application, Ser. No. 08/616,867, filed Apr. 2, 1997, entitled Improved Electrochromic Layer and Devices Comprising Same discloses and claims preferred crosslinked polymer matrices. The entire disclosure of copending application Ser. No. 08/616,867 is hereby incorporated herein by reference.

The window 10 embodying the present invention is depicted in schematic, simplified cross section in FIG. 1 of the drawings, and since some of the layers of the window are very thin, the scale has been distorted for pictorial clarity. As shown in FIG. 1, the window 10 includes a sealed chamber 20. In this embodiment of the invention, the transparent element 16 may be considered to be facing the outside of a building while the transparent element 18 may be considered to be facing the inside of a building. The transparent element 16 has a partially light reflective and a partially light transmissive layer 22 thereon, the layer 22 also being electrically conductive. The layer 22 may be a combination of multiple layers where the individual layers may be either electrically conductive or nonconductive, however the layer in contact with the fluid must be conductive. The other transparent element 18 has a transparent electrically conductive layer 24 thereon. The chamber 20 is thus defined by the electrically conductive, partially light reflective and partially light transmissive layer 22, the sealing member 26, and the transparent electrically conductive layer 24. The electrochromic medium 14 having the desired electrochromic properties is disposed within the chamber 20.

As schematically illustrated in FIG. 1, means is provided for applying electrical potential to the electrochromic medium to cause variations in the light transmittance of the electrochromic medium, such means including a source of electrical power 28, the terminals 30 and 32 of which are electrically connected to the layers 22 and 24, respectively, through the agency of conductors 34 and 36, respectively, and a conventional switch means 38. A conventional rheostat controlled buffer amplifier 40 is also preferably provided to facilitate adjustment of the electrical power applied to the electrochromic medium. It will be understood that any desired or conventional means may be provided for controlling and applying electrical potential to the layers 22 and 24.

Light rays from outside a building enter through the transparent element 16, the electrically conductive, partially light reflective and partially light transmissive layer 22 and the electrochromic medium 14 before being transmitted through the transparent electrically conductive layer 24 and the transparent element 18 to the inside of the building. Thus, the entering light rays are not only attenuated in a conventional manner by the transparent elements 16 and 18 and the layer 24 but the entering light rays are also attenuated both by the electrically conductive, partially light reflective and partially light transmissive layer 22 and by the degree to which the electrochromic medium 14 is light absorbing. When the electrochromic medium is highly light absorbing, the intensity of the entering light rays reaching the inside of the building is diminished. Thus the basic structural elements of the electrochromic structure in this embodiment of the invention include the two transparent elements 16 and 18, the sealing member 26 which spaces apart and holds the transparent elements 16 and 18 in spaced substantially parallel relationship in an assembled window and which surround the chamber 20 which in an assembled window is defined by the layers 22 and 24 as well as by the circumferential inside walls of the spacing and sealing member 26. The volume of the chamber 20 may, for example, be filled with any of the solutions disclosed in U.S. Pat. No. 4,902,108 or Ser. No. 08/832,596 which have reversibly variable transmittance in the operation of the window, the solution in the chamber being in contact with both the layers 22 and 24.

As illustrated in FIG. 1, the frame 12 surrounds the electrochromic assembly in a circumferential manner, the frame 12 including flange portions 42 and 44 integrally joined by a web portion 46. The frame 12 conceals the edge portions of the transparent elements 16 and 18 and the sealing member 26, the frame 12 thus extending around the entire circumference of the electrochromic window 10.

Referring in greater detail to the drawings, the electrochromic window 10 embodying the present invention includes the transparent element 16 having a front face 48 and a rear face 50, and the transparent element 18 having a front face 52 and a rear face 54. The transparent element 16 and the transparent element 18 may be formed of any of a number of materials which are transparent in the visible region of the light spectrum and which have sufficient thickness and strength to withstand the forces exerted thereon that may vary, for example, as a result of varying temperatures and/or impact forces conventionally exerted on windows. The elements 16 and 18 may be formed of various types of window glass or polymers or plastic sheet materials and the like. By way of example, the elements 16 and 18 may be formed of polyolefins such as Cyclic Olefin Copolymers, like Topas, available from Hoechst of Frankfurt, Germany, or polycarbonate such as CR-39 from PPG of Pittsburgh, Pa., or acrylics such as Lucite from Dow Chemical of Midland, Mich., or polyester such as mylar available from DuPont of Wilmington, Del., or commercially available clear polyvinyl chloride or polystyrene polymer. Topas has significant advantages such as its ability to resist solvents such as propylene carbonate.

It will be understood that, if desired, the elements 16 and 18 may be formed of other suitable glass or plastic and may possess ultraviolet barrier properties to protect the electrochromic material. As previously mentioned, a layer 22 of partially light reflective and partially light transmissive electrically conductive material is deposited on the rear face 50 of the element 16 to act as an electrode, and another layer 24 of transparent electrically conductive material is deposited on the front face 52 of the transparent element 18. One or both of the layers 22 and 24 may cover the entire surfaces of the elements 16 and 18, respectively, on which they are deposited or they may cover the surfaces of the elements 16 and/or 18 inside the inner circumferential wall of the sealing member 26. This may be accomplished by masking or by removing the layers 22 and 24 by laser scraping. Those skilled in the art will understand that some conductive material must come out to the edge to impart the electrical potential. The layers 22 and 24 may be of any suitable material which adheres satisfactorily to the aforementioned surfaces of the elements 16 and 18, is resistant to adverse interaction with any materials within the electrochromic window that the layers 16 and 18 may come in contact with, is resistant to adverse interaction with the electrochromic medium, has applicable light transmission, and good electrical conductance.

The layer 22 of partially light reflective and partially light transmissive electrically conductive material may be any material which does not adversely affect the electrochromic medium and further allows a portion of the electromagnetic spectrum to pass through while simultaneously reflecting a portion of the electromagnetic spectrum. Preferably, the portions that are transmitted and reflected should be broadband so that the reflected light that is viewed does not look colored. However, those skilled in the art will understand that, if desired, a colored reflected light may be provided.

The layer 22 of partially light reflective and partially light transmissive electrically conductive material may comprise aluminum, silver or silver alloys, with the alloys comprising silver/gold, silver platinum, silver palladium or silver titanium. The thickness of layer 22 may range from about 30 angstrom to about 500 angstrom and is preferably between about 50 angstrom and about 150 angstrom. U.S. Pat. No. 5,818,625, issued Oct. 6, 1998, and entitled Electrochromic Rearview Mirror Incorporating a Surface Metal Reflector, discloses and claims reflectors that may be used in the present invention. The entire disclosure of U.S. Pat. No. 5,818,625 is hereby incorporated herein by reference.

The layer 24 of transparent electrically conductive material may be indium doped tin oxide (ITO) or fluorine doped tin oxide (FTO), either of which may be color suppressed as is known in the art.

By way of example, in this embodiment of the invention, the element 16 may be float glass coated on the surface 50 thereof with a layer 22 of an alloy of 3% palladium and 97% silver so as to have 59% light transmission, 30% light reflection, and a sheet resistance of 10 ohms per square. The element 18 may also be float glass coated on the surface 52 thereof with a layer 24 of fluorine doped tin oxide having a sheet resistance of 12–13 ohms per square and marketed by LOF of Toledo, Ohio as TEC glass. As previously mentioned, the chamber 20 may be filled with any of the electrochromic solutions disclosed in U.S. Pat. No. 4,902,108. With the above mentioned construction, typical values of visible light transmission and light reflection from the side A and the side B for the clear and fully darkened states of the electrochromic medium may be measured as follows:

| State | Side | % Transmission | % Reflectance |
|-------|------|----------------|---------------|
| Clear | A    | 57.3           | 22.9          |
| Clear | B    | 57.3           | 21.6          |
| Dark  | A    | 3.8            | 20.3          |
| Dark  | B    | 3.8            | 6.3           |

In similar but generally well lit conditions, visibility from the side A to the side B is difficult when the window is darkened because of the reflectance provided by the layer 22 while visibility from the side B to the side A is not significantly altered by the partially reflective coating provided by the layer 22 which also functions as an electrode for the window. Since the visibility from the side A is difficult because of the aforementioned reflectance combined with the decrease in transmission, while visibility from the side B to the side A is altered by a decrease in both transmission and reflectance, a different level of privacy is provided when viewing the window from one direction (side A) as compared to the other direction (side B). Moreover, the partially light reflective and partially light transmissive layer 22 hides changes in the color of the electrochromic medium when viewed from the side A and enhances changes in color of the electrochromic medium when viewed from the side B. In addition, with the layer 22 deposited on the surface 50 of the element 16, the reflective and associated materials are protected from abrasion, scratches, weathering and the like. Also, with the layer 24 deposited on the surface 52 of the layer 24, the layer 24 is also protected from abrasion, scratches, weathering and the like.

It should also be understood that, if desired, conventional anti-scratch material may be applied to the exposed surfaces 48 and 54 of the elements 16 and 18, respectively. An antireflective coating could also be added to the surface 54 to further reduce the reflection as viewed from the side B.

As shown in FIG. 1, the element 16 is sealably bonded to the element 18 in a spaced apart and parallel relationship by the seal member 26 disposed between and adhered to the layers 22 and 24. The seal member 26 is generally disposed around the entire periphery of the elements 16 and 18, and the seal member may be formed of any suitable material which is capable of adhesively bonding the layers 22 and 24, while, after adhering, being capable of maintaining a generally constant distance therebetween. The seal member 26 should also not be permeable to water or oxygen to any significant degree, and should be generally inert with respect to the electrochromic material disposed in the chamber 20. By way of example, the seal member 26 may comprise a strip or gasket of polymeric material, such as rubber, urethane, acrylate, epoxies and the like. Copending U.S. patent application, Ser. No. 09/158,423, filed Sep. 21, 1998, entitled Improved Seal for Electrochromic Devices discloses and claims an improved epoxy for bonding to a reflective layer. The entire disclosure of copending application Ser. No. 09/158,423 is hereby incorporated herein by reference.

The chamber 20 defined by the layers 22 and 24, and by the inner circumferential wall of the seal member 26 is filled with the electrochromic medium 14. The electrochromic medium is capable of changing properties such that light traveling therethrough is variably attenuated when variable voltage is applied to the electrochromic medium. Thus, the electrochromic medium provides continuously variable light transmittance and is gray-scale controllable. The electrochromic media disclosed and claimed in the above referenced U.S. Pat. No. 4,902,108 meets these criteria and is preferred although it will be understood that, if desired, other electrochromic media having the requisite properties may be utilized. It should also be understood that the electrochromic media may be inserted in the chamber 20 through one or more sealable fill ports (not shown) through well known techniques such as by injection, vacuum back filling and the like.

The electrochromic medium may be self-erasing. In such a system, the intensity of the light is modulated or attenuated by passing through the electrochromic medium which is in contact with the electrically conductive layers 22 and 24. Typically the electrochromic medium 14 includes at least one anodic compound and at least one cathodic compound. The anodic compound is electrochemically oxidized and the cathodic compound is electrochemically reduced when a DC electrical potential difference is impressed across the electrochromic media. The self-erasing property means that, after a potential difference between the layers 22 and 24 is decreased or eliminated, the transmittance of the electrochromic solution 14 in the chamber 20 will increase spontaneously, without the need of reversal of the polarity of the electrodes, to a value characteristic of the new potential difference. The self-erasing feature is provided by the spontaneous, apparently diffusion-limited, reactions of oxidized anodic compounds with reduced cathodic compounds to yield anodic compounds and cathodic compounds in their respective zero-potential equilibrium states.

In windows and panels embodying the present invention, electrical current may be applied to the layers 22 and 24 through the agency of the power source 28, and an electrical potential is thus impressed across and darkens the electrochromic medium. For a single-compartment, self-erasing, solution-phase electrochromic device, when the potential is sufficient for current to flow through the solution-phase electrochromic medium, the anodic material is continually being oxidized and the cathodic material is being reduced to replace the anodic and cathodic compounds which diffuse away from the layers 22 and 24 and spontaneously react to form non-colored species in the bulk of the electrochromic medium. As more electrical power is impressed on the electrochromic medium, the electrochromic medium darkens further. When less electrical power is applied to the electrochromic medium, the transmittance of light by the electrochromic medium spontaneously increases to a new level because the number of species being electrochemically colored is less than before. It will be understood that accurate adjustment may be obtained through the agency of the conventional rheostat controlled buffer amplifier 40 without the need for complicated circuitry. Thus, when the selected adjusted voltage is applied between the layers 22 and 24, the electrical potential difference between the layers causes the electrochromic species within the electrochromic material to be either reduced or oxidized thereby allowing current flow through the electrochromic medium. As a result, the window darkens, i.e. attenuates the light traveling therethrough. When the electrical potential difference is reduced or removed, the window becomes less dark or clears completely when the electrical potential is completely removed.

Another embodiment of the invention is schematically illustrated in FIG. 2 of the drawings. This embodiment of the invention includes many of the components of the embodiment of the invention illustrated in FIG. 1, and is comprised of a window, generally designated 110, which includes the frame 12 which carries the two transparent elements 16 and 18, the seal member 26 which spaces apart and holds the transparent elements 16 and 18 in spaced substantially parallel relationship in an assembled window and which surrounds a chamber 120 which may be filled with any of the electrochromic media previously described. In this embodiment of the invention, the transparent element 16 has a partially light reflective and partially light transmissive layer 122 on the outside surface 48 thereof, and the transparent element 16 also has a transparent electrically conductive layer 123 on the inside surface 50 thereof. The transparent element 18 has the transparent electrically conductive layer 24 on the inside surface 52 thereof as previously described. Thus, in this embodiment of the invention, the chamber 120 is defined by the transparent electrically conductive layer 123, the seal member 26, and the transparent electrically conductive layer 24, the electrochromic medium 14 disposed in such chamber.

In this embodiment of the invention, and as illustrated in FIG. 2, means is also provided for applying electrical potential to the electrochromic medium to cause variations in the light transmittance of the electrochromic medium, such means including the source of electrical power 28 previously described, the terminals 30 and 32 of which are electrically connected to the layers 123 and 24, respectively, through the agency of the conductors 34 and 36, respectively, and the switch means 38. The rheostat controlled buffer amplifier 40 previously described facilitates adjustment of the electrical power applied to the electrochromic medium, it being understood that any other desired or conventional means may be provided for controlling and applying electrical potential to the layers 123 and 24.

In this embodiment of the invention, light rays from outside a building enter through the partially light reflective and partially light transmissive layer 122, the transparent element 16, and the transparent electrically conductive layer 123 before being transmitted through the electrochromic medium 14, the transparent electrically conductive layer 24 and the transparent element 18 to the inside of the building. Thus, the entering light rays are attenuated both by the partially light reflective and partially light transmissive layer 122 and by the degree to which the electrochromic medium 14 is light absorbing. When the electrochromic medium is highly light absorbing, the intensity of the entering light rays reaching the inside of the building is diminished.

It will be understood that in this embodiment of the invention the layer 122 may be any of those previously described, such as an alloy of 3% palladium and 97% silver so as to have 59% light transmission and 30% light reflection as described in connection with the embodiment of the invention illustrated in FIG. 1. In this embodiment of the invention, the layer 123 and the layer 24 may each be fluorine doped tin oxide having, for example, a sheet resistance of 12–13 ohms per square.

Typical values of light transmission and light reflection from the side A and the side B for the clear and fully darkened states of the electrochromic medium should be substantially the same as the values set forth in connection with the embodiment of the invention illustrated in FIG. 1. Thus, under similar lighting conditions, visibility from the side A to the side B is difficult because of the reflected images provided by the layer 122 while visibility from the side B to the side A is not significantly altered by the partially reflective coating provided by the layer 122 between the dark and clear state, other than the decrease in transmission resulting from the electrochromic medium being darkened. Moreover, since the visibility from the side A is difficult because of the reflected images while visibility from the side B to the side A is not significantly altered by the partially reflective coating 122, a different level of privacy is provided when viewing the window from one direction as compared to the other direction. Also, the partially light reflective and partially light transmissive layer 122 hides changes in the color of the electrochromic medium when viewed from the side A and enhances changes in the color of the electrochromic medium when viewed from the side B.

Another embodiment of the invention is schematically illustrated in FIG. 3 of the drawings. This embodiment of the invention also includes many of the components of the embodiments of the invention illustrated in FIGS. 1 and 2, and is comprised of a window, generally designated 210, which includes the frame 12 which supports the two transparent elements 16 and 18, the sealing member 26 which spaces apart and holds the transparent elements 16 and 18 in spaced substantially parallel relationship in an assembled window and which surrounds a chamber 220 which may be filled with any of the electrochromic media described hereinabove in greater detail. In this embodiment of the invention, the transparent element 16 has a transparent electrically conductive layer 222 on the inside surface 50 thereof while the transparent element 18 has a partially light reflective and partially light transmissive layer 224 on the inside surface 52 thereof, the layer 224 also being electrically conductive. Thus, in this embodiment of the invention, the chamber 220 is defined by the transparent electrically conductive layer 222, the edge seal 26, and the partially light reflective, partially light transmissive, electrically conductive layer 224. The electrochromic medium is contained within the chamber 220 in the manner previously described.

While preferred embodiments of the invention have been illustrated and described, it will be understood that various changes and modifications may be made without departing from the spirit of the invention.

What is claimed is:

1. An electrochromic structure comprising:
    a first element having a first side and a second side;
    a second element having a first side and a second side, said first side of said second element confronting said second side of said first element, said first and second elements being spaced apart to define a chamber therebetween;
    a first electrically conductive layer carried on said second side of said first element;
    a partially reflective electrically conductive layer carried on said first side of said second element; and
    an electrochromic medium in said chamber and electrically coupled with said first electrically conductive layer and said partially reflective electrically conductive layer.

2. The electrochromic structure of claim 1 and further comprising a power source electrically coupled to said first electrically conductive layer and said partially reflective electrically conductive layer for applying an electrical potential to said electrochromic medium to cause variations in the transmittance of said electrochromic medium.

3. The electrochromic structure of claim 1, wherein said first electrically conductive layer is transparent to visible light.

4. The electrochromic structure of claim 1, wherein said first and second elements are transparent to visible light.

5. The electrochromic structure of claim 1, wherein said partially reflective layer comprises an alloy including palladium and silver.

6. The electrochromic structure of claim 1, wherein said first electrically conductive layer comprises fluorine doped tin oxide.

7. The electrochromic structure of claim 1, wherein said electrochromic medium is gray-scale controllable over a continuous range of visible light transmittance.

8. The electrochromic structure of claim 1, wherein said partially reflective layer partially reflects visible light.

9. The electrochromic structure of claim 1, wherein said first electrically conductive layer is directly coupled to said electrochromic medium.

10. An electrochromic architectural window for a building structure, said window comprising:
    a first element having a first side and a second side, said first side of said first element configured to face the inside of the building structure;
    a second element having a first side and a second side, said first side of said second element confronting said second side of said first element, said first and second elements being spaced apart to define a chamber therebetween, said second side of said second element configured to face the outside of the building structure;
    a first electrically conductive layer carried on said second side of said first element;
    a partially reflective electrically conductive layer carried on said first side of said second element; and
    an electrochromic medium in said chamber and electrically coupled with said first electrically conductive layer and said partially reflective electrically conductive layer.

11. The electrochromic window of claim 10 and further comprising a power source electrically coupled to said first electrically conductive layer and said partially reflective electrically conductive layer, for applying an electrical potential to said electrochromic medium to cause variations in the transmittance of said electrochromic medium.

12. The electrochromic window of claim 10, wherein said first electrically conductive layer is transparent to visible light.

13. The electrochromic window of claim 10, wherein said first and second elements are transparent to visible light.

14. The electrochromic window of claim 10, wherein said partially reflective layer comprises an alloy including palladium and silver.

15. The electrochromic window of claim 10, wherein said first electrically conductive layer comprises fluorine doped tin oxide.

16. The electrochromic window of claim 10, wherein said electrochromic medium is gray-scale controllable over a continuous range of visible light transmittance.

17. The electrochromic window of claim 10, wherein said partially reflective layer partially reflects visible light.

18. The electrochromic window of claim 10, wherein said first electrically conductive layer is directly coupled to said electrochromic medium.

19. An electrochromic architectural window for a building structure, said window comprising:

a first transparent element having a first side and a second side, said first side of said first element configured to face the inside of the building structure;

a second transparent element having a first side and a second side, said first side of said second element confronting said second side of said first element, said first and second elements being spaced apart to define a chamber therebetween, said second side of said second element configured to face the outside of the building structure;

a first transparent electrically conductive layer carried on said second side of said first element;

a second transparent electrically conductive layer carried on said first side of said second element;

a partially reflective layer carried on said second side of said second element, said partially reflective layer partially reflecting visible light impinging upon the window from the outside of the building structure; and an electrochromic medium in said chamber and electrically coupled with said first and second transparent electrically conductive layers.

20. The electrochromic window of claim 19 and further comprising a power source electrically coupled to said first and second electrically conductive layers for applying an electrical potential to said electrochromic medium to cause variations in the transmittance of said electrochromic medium.

21. The electrochromic window of claim 19, wherein said partially reflective layer comprises an alloy including palladium and silver.

22. The electrochromic window of claim 19, wherein said first electrically conductive layer comprises fluorine doped tin oxide.

23. The electrochromic window of claim 19, wherein said electrochromic medium is gray-scale controllable over a continuous range of visible light transmittance.

24. The electrochromic window of claim 19, wherein said first and second transparent electrically conductive layers are directly coupled to said electrochromic medium.

* * * * *